J. B. Atwater,
Cattle Pump.
N° 52,011. Patented Jan. 16, 1866.
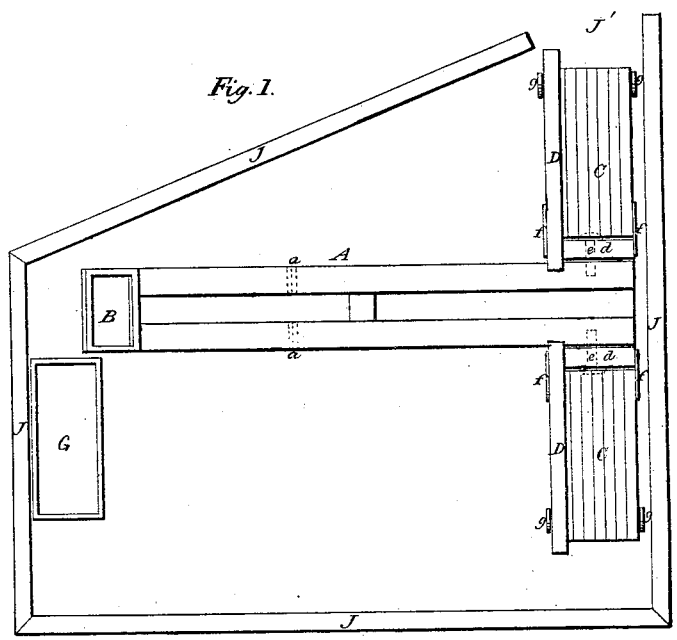
Fig. 1.
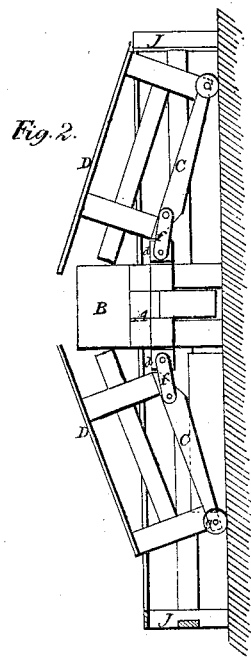
Fig. 2.
Fig. 3.
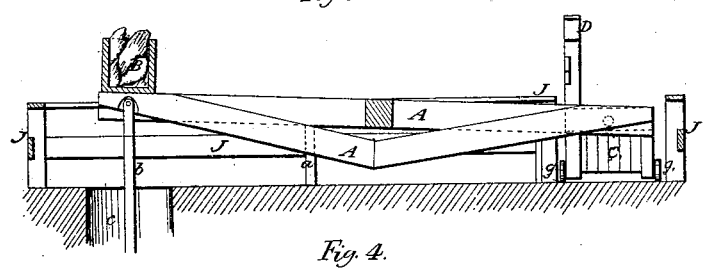
Fig. 4.
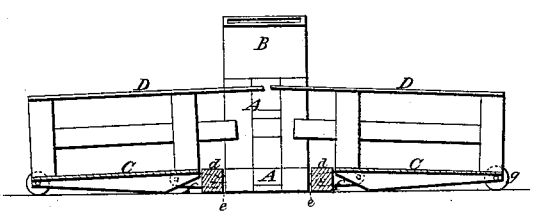
Fig. 5.
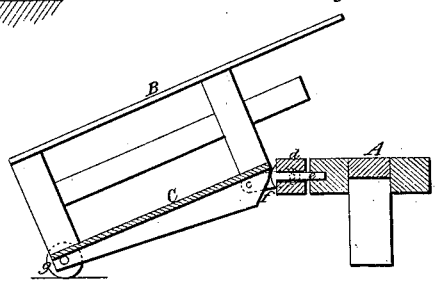
Witnesses:
R. Campbell
Edw. Schafer
Inventor,
J. B. Atwater
by his Attys
Mason, Fenwick & Lawrence

UNITED STATES PATENT OFFICE.

JOHN B. ATWATER, OF CHICAGO, ILLINOIS.

IMPROVEMENT IN CATTLE-PUMPS.

Specification forming part of Letters Patent No. 52,011, dated January 16, 1866.

*To all whom it may concern:*

Be it known that I, J. B. ATWATER, of Chicago, in the county of Cook and State of Illinois, have invented a new and Improved Cattle-Pump; and I do hereby declare that the following is a full, clear, and exact description thereof, reference being had to the accompanying drawings, making a part of this specification, in which—

Figure 1 is a top view of the improved pumping apparatus arranged within an inclosure. Fig. 2 is an elevation of the hinged platforms attached to the pumping-lever, a portion of the fence being removed. Fig. 3 is a vertical longitudinal section of the loaded pumping-lever for operating the pumping apparatus. Fig. 4 is a vertical sectional view through the hinged platforms in a depressed state. Fig. 5 is an enlarged sectional view of one of the platforms, showing the mode of pivoting it to the long arm of the pumping-lever.

Similar letters of reference indicate corresponding parts in the several figures.

This invention relates to that class of stock-pumps which are constructed in such manner that the animals effect the raising of water themselves on approaching the trough from which they drink.

Pumps which have hitherto been constructed to operate upon this plan fail to elevate a sufficient quantity of water to quench the thirst of the animals on account of a want of power, which cannot be practically derived from the weight of the animals alone.

Another objection to pumps of this class which have hitherto been used is that only one animal can drink at a time, and no provision is made for supplying water to herds which may be in adjoining fields.

The main object of my invention is to arrange a contrivance for elevating water, and also a drinking-trough, within a yard or inclosure of a suitable description in such manner that the animals, upon entering or leaving such inclosure, will operate the pump and supply the trough with water, as will be hereinafter described.

Another object of my invention is to combine a platform over which the animals are required to pass to obtain water with a heavily-loaded lever in such manner that the fixed weight upon the lever is caused to elevate the water from the well, instead of the weight of the animal or animals, thus admitting of the employment of any required amount of power and the raising of a larger amount of water from a well of a given depth than could be effected by the weight of the animals alone, as will be hereinafter described.

To enable others skilled in the art to understand my invention, I will describe its construction and operation.

In the accompanying drawings, A represents a long lever, which consists of two beams of an equal length, that are secured to the sides of trussed braces, as shown in Figs. 1 and 3, for the purpose of obtaining great strength and steadiness. This lever is mounted upon two vertical standards, *a a*, which constitute its fulcrum, and upon one end—the short arm of the lever—a box, B, is secured for receiving a weight. This box is merely intended to keep in place a number of heavy weights. It may be dispensed with and the weight or weights secured in any other convenient manner, so that they will not be liable to fall off the lever. Attached to this loaded short arm of the lever A is the piston-rod *b*, for working any suitable pump, which is constructed to elevate water from a well, *c*, by the descent of the loaded arm of the lever A.

At or near the end of the long arm of lever A, and on the longitudinal sides thereof, two beams, *d d*, are pivoted by coupling-pins *e e*, and to these beams platforms C C are connected by means of pivoted side straps, *f f*. These two platforms C C have rails D D on one side, for preventing animals from stepping off these sides. The rear or outer ends of the platforms are mounted upon small rollers or wheels *g g*, which allow these ends to move freely when the long arm of the lever A is depressed, so as to bring the platforms down to the nearly-horizontal plane, as shown in Fig. 4.

On one side of the lever A is a trough, G, which may be of sufficient capacity to allow a number of animals to drink at the same time. This trough is supplied with water from the pump at every downward stroke of the short or loaded arm of the lever A.

The apparatus which I have above described is inclosed by means of a fence, J, so that the animals will have to enter at the opening J', pass over the platforms C C, and leave these platforms before they can reach the trough G, in doing which the animals depress the long arm of the lever A and allow the weight on the short arm to act directly upon the pump-piston. Then, upon leaving the yard or inclosure, the animals will again operate the pump in the same manner.

The fulcrum of the lever A is located nearer one end of this lever for the purpose of causing the weight of a small animal passing over the platforms C C to lift the load on the short arm of this lever, which load may, in some instances, have to be heavier than several of the heaviest animals in order to elevate the required quantity of water. Hence it is that provision is made for allowing one or more animals to elevate the weight on the lever, which weight will descend as soon as the platforms are relieved of their load.

By arranging the pumping apparatus within the yard or inclosure, as shown in Fig. 1, and making this yard sufficiently large, any number of animals can drink at the same time, and while this is the case, it will be seen that there will always be a sufficient quantity of water pumped up from the well for those that pass into the inclosure. When the animals leave the inclosure after drinking they again operate the pump and elevate more water, so that this surplus water may be conducted off and used for other purposes.

If at any time it is desired to shorten or lengthen the loaded arm of the lever A, this may be done by changing the position of the props $a$ $a$ without altering the relative position of the platforms with the entrance into the inclosure.

Having thus described my invention, what I claim as new, and desire to secure by Letters Patent, is—

1. Arranging a stock-pumping apparatus, and also a drinking-trough, within a yard or inclosure in such manner that the animals, upon entering or leaving such inclosure, will operate the pump and supply the trough with water, substantially as described.

2. The pumping-lever A, having platforms C C applied to one arm and a weight applied directly to the other arm, substantially as described.

JOHN B. ATWATER.

Witnesses:
  Lu. H. Drury,
  J. Q. Hoyt.